United States Patent
Saneyoshi et al.

(10) Patent No.: US 9,085,234 B2
(45) Date of Patent: Jul. 21, 2015

(54) DIFFERENTIAL UNIT AND VEHICLE EQUIPPED WITH THE SAME

(75) Inventors: Yuichiro Saneyoshi, Wako (JP); Kenji Hama, Wako (JP); Makoto Nishida, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 356 days.

(21) Appl. No.: 13/492,253

(22) Filed: Jun. 8, 2012

(65) Prior Publication Data

US 2012/0313361 A1 Dec. 13, 2012

(30) Foreign Application Priority Data

Jun. 8, 2011 (JP) .................................. 2011-127803

(51) Int. Cl.
*B60K 17/16* (2006.01)
*B62D 25/20* (2006.01)
*B60K 15/03* (2006.01)

(52) U.S. Cl.
CPC ................ *B60K 17/16* (2013.01); *B62D 25/20* (2013.01); *B60G 2204/19* (2013.01); *B60K 2015/03375* (2013.01)

(58) Field of Classification Search
CPC ...... B60K 17/16; B60K 17/165; B60K 17/20; B60G 2204/19
USPC ............................ 180/274, 352, 354, 360, 378
See application file for complete search history.

(56) References Cited

U.S. PATENT DOCUMENTS

| | | | | |
|---|---|---|---|---|
| 1,834,879 | A | * | 12/1931 | Trott .............................. 180/291 |
| 4,596,299 | A | * | 6/1986 | Krude ............................. 180/348 |
| 4,652,009 | A | * | 3/1987 | Ando et al. ............ 280/124.109 |
| 4,856,751 | A | * | 8/1989 | Ohba .............................. 248/638 |
| 5,884,723 | A | * | 3/1999 | Kleinschmit et al. .......... 180/360 |
| 6,209,676 | B1 | * | 4/2001 | Jones et al. ..................... 180/354 |
| 6,298,936 | B1 | * | 10/2001 | Yoshida ......................... 180/232 |
| 7,360,622 | B2 | * | 4/2008 | Lee et al. ........................ 180/377 |
| 2006/0076179 | A1 | * | 4/2006 | Lee et al. ........................ 180/299 |
| 2006/0237938 | A1 | * | 10/2006 | Imre et al. .............. 280/124.116 |
| 2013/0008735 | A1 | * | 1/2013 | Hiramatsu et al. ............. 180/291 |
| 2013/0292932 | A1 | * | 11/2013 | Stenzenberger et al. ...... 280/790 |

FOREIGN PATENT DOCUMENTS

JP 2000-043594 A 2/2000

OTHER PUBLICATIONS

Machine translation of JP2000-043594.*

* cited by examiner

*Primary Examiner* — Paul N Dickson
*Assistant Examiner* — Barry Gooden, Jr.
(74) *Attorney, Agent, or Firm* — Westerman, Hattori, Daniels & Adrian, LLP

(57) ABSTRACT

A vehicle includes a fuel tank disposed adjacent to a propeller shaft in a widthwise direction of the vehicle, and a differential unit coupled to a rear end of the propeller shaft. The differential unit includes a differential gear coupled to the rear end of the propeller shaft, a housing positioned rearward of the fuel tank to accommodate the differential gear, a bracket member fixed to the rear sub-frame, a plurality of bolts that fasten the housing and a first bracket together, and a stay member provided separate from the bolts to couple the housing and the first bracket together.

12 Claims, 6 Drawing Sheets

DIFFERENTIAL UNIT AND VEHICLE EQUIPPED WITH THE SAME

CROSS REFERENCES TO RELATED APPLICATIONS

The present application claims priority under 35 U.S.C. §119 to Japanese Patent Application No. 2011-127803, filed Jun. 8, 2011, entitled "Differential Unit and Vehicle Equipped with The Same." The contents of this application are incorporated herein by reference in their entirety.

TECHNICAL FIELD

The disclosure relates to a differential unit having a differential gear coupled to the rear end of a propeller shaft and positioned rearward of a fuel tank, and a vehicle equipped with the differential unit.

BACKGROUND OF THE INVENTION

For example, a 4 WD (Four Wheel Drive) vehicle and an FR (Front engine Rear drive) vehicle use a saddle type fuel tank whose bottom side is curved upward at a center portion in the widthwise direction of the vehicle in order to avoid interference with a propeller shaft running through the center of the vehicle. Such a fuel tank adjoins the propeller shaft in the widthwise direction of the vehicle.

As shown in FIG. 6A, a differential gear 204 disposed rearward of a fuel tank 202 (in the direction of an arrow Rr) is coupled to the rear end of such a propeller shaft 200. A housing 206 accommodating the differential gear 204 is inserted into a through hole 210 formed in a rear sub-frame 208 forming a part of the vehicle body.

The housing 206 is mounted on the rear sub-frame 208 by a pair of mount parts 212L, 212R provided on both sides of a front end portion of the housing 206 in the widthwise direction of the vehicle (in the direction of an arrow L and direction of an arrow R) and a mount part 214 provided on the rear end of the housing 206 (see, for example, Japanese Unexamined Patent Application Publication No. 2000-43594).

The mount part 214 according to the related art includes a first bracket 216 connected to the housing 206, a second bracket 218 connected to the rear sub-frame 208, a bolt 220 that penetrates the first bracket 216 in the widthwise direction of the vehicle to fasten the first bracket 216 and the second bracket 218 together.

According to the foregoing related art, when a collision occurs on the front side of the vehicle, for example, the buffer load that acts rearward of the vehicle (toward the differential gear 204) is applied to the propeller shaft 200, so that the propeller shaft 200 may be broken and the connecting portion at which the propeller shaft 200 and the pair of mount parts 212L, 212R are connected may be fractured as shown in FIG. 6B.

As a result, moment in the direction of an arrow A acts on the housing 206, so that the portions at which the first bracket 216 and the second bracket 218 are fastened are separated from each other. Particularly, as apparent from FIG. 6B, force in the direction of pulling the bolt 220 acts on the housing 206, so that the bolt 220 is very likely to come off.

Consequently, as shown in FIG. 6C, the housing 206 separated from the rear sub-frame 208 may be thrown out forward of the vehicle (in the direction of an arrow Fr), and may collide with the fuel tank 202, thus damaging the fuel tank 202. The damage on the fuel tank 202 by the housing 206 separated from the rear sub-frame 208 this way may occur upon collision of the vehicle on its side, on its rear side or the like.

In addition, according to the related art, the separated housing 206 (differential gear 204) may hit a pedestrian, another vehicle or the like nearby.

SUMMARY OF THE INVENTION

Accordingly, it is desirable to provide a differential unit that prevents a fuel tank from being damaged by inhibiting a housing from being separated from a rear sub-frame upon collision of a vehicle, and a vehicle equipped with the differential unit.

[1] According to one aspect of an exemplary embodiment of the disclosure, there is provided a differential unit for use in a vehicle including a rear sub-frame forming a part of the vehicle body frame, a propeller shaft extending in a fore-and-aft direction of the vehicle, and a fuel tank disposed adjacent to the propeller shaft in a widthwise direction of the vehicle. The differential unit includes a differential gear coupled to a rear end of the propeller shaft, a housing positioned rearward of the fuel tank to accommodate the differential gear, a bracket member fixed to the rear sub-frame, a fastening member that fastens the housing and the bracket member together, and a stay member provided separate from the fastening member to couple the housing and the bracket member together.

The stay member which couples the housing and the bracket member together is provided separate from the fastening member in the differential unit according to this aspect, so that when the fastening member fastening the housing and the bracket member together comes off upon collision of the vehicle, for example, it is possible to desirably suppress separation of the housing from the bracket member (rear sub-frame). This can inhibit the housing from hitting the fuel tank, thereby preventing the fuel tank from being damaged by the housing.

[2] In the differential unit, it is preferable that the fastening member should be a bolt extending in the widthwise direction of the vehicle with the housing and the bracket member fastened together, and the stay member should have a stay body, a first fastening bolt extending in a direction orthogonal to the widthwise direction of the vehicle to couple the stay body and the housing together, and a second fastening bolt extending in the direction orthogonal to the widthwise direction of the vehicle to couple the stay body and the bracket member together.

With the above configuration, the first fastening bolt and the second fastening bolt extend in the direction orthogonal to the extending direction of the bolt (widthwise direction of the vehicle), so that even if moment in the direction of pulling the bolt acts on the housing upon collision of the vehicle, it is possible to make separation of the first fastening bolt and the second fastening bolt difficult. This makes it possible to surely suppress separation of the housing from the bracket member.

[3] In the differential unit, it is preferable that the housing should have a housing body and a projection which projects rearward of the vehicle from the housing body and to which the fastening member is attached, the stay member should be disposed across the projection, the first fastening bolt should be attached to that portion of an outer surface of the housing body which faces rearward of the vehicle, and the second fastening bolt should be attached to that portion of an outer surface of the bracket member which faces rearward of the vehicle.

With this configuration, the stay member can be arranged efficiently, thus suppressing enlargement of the differential unit.

[4] In the differential unit, it is preferable that the stay body should be formed in a plate-like shape and be curved.

Because the stay body is formed like a plate and curved, the stay body can be easily made to ride across the projection constituting the housing.

[5] In the differential unit, it is preferable that the bracket member should have a fixture part penetrating the rear sub-frame in the fore-and-aft direction of the vehicle, and a separation inhibiting member inhibiting the fixture part from coming out of a through hole formed in the rear sub-frame.

With this configuration, the bracket member 69 has the fixture part and the separation inhibiting member, so that it is possible to surely suppress the bracket member from being separated from the rear sub-frame upon collision of the vehicle.

[6] According to another aspect of the exemplary embodiment of the disclosure, there is provided a vehicle including a vehicle body frame, a rear sub-frame forming a part of the vehicle body frame, a propeller shaft extending in a fore-and-aft direction of the vehicle, a fuel tank disposed adjacent to the propeller shaft in a widthwise direction of the vehicle, and a differential gear according to the first aspect coupled to a rear end of the propeller shaft.

The vehicle according to this aspect demonstrates effects similar to those of the foregoing differential unit according to the first aspect.

BRIEF DESCRIPTION OF THE DRAWINGS

The advantages of the invention will become apparent in the following description taken in conjunction with the drawings, wherein.

DETAILED DESCRIPTION OF THE INVENTION

A differential unit according to a preferred embodiment of the disclosure, and a vehicle equipped with the differential unit will be described hereinafter by way of example with reference to the accompanying drawings. For ease of understanding, the left side of the vehicle is indicated by an arrow "L", the right side of the vehicle by an arrow "R", the frontward of the vehicle by an arrow "Fr", and the rearward of the vehicle by an arrow "Rr".

Figure 1:
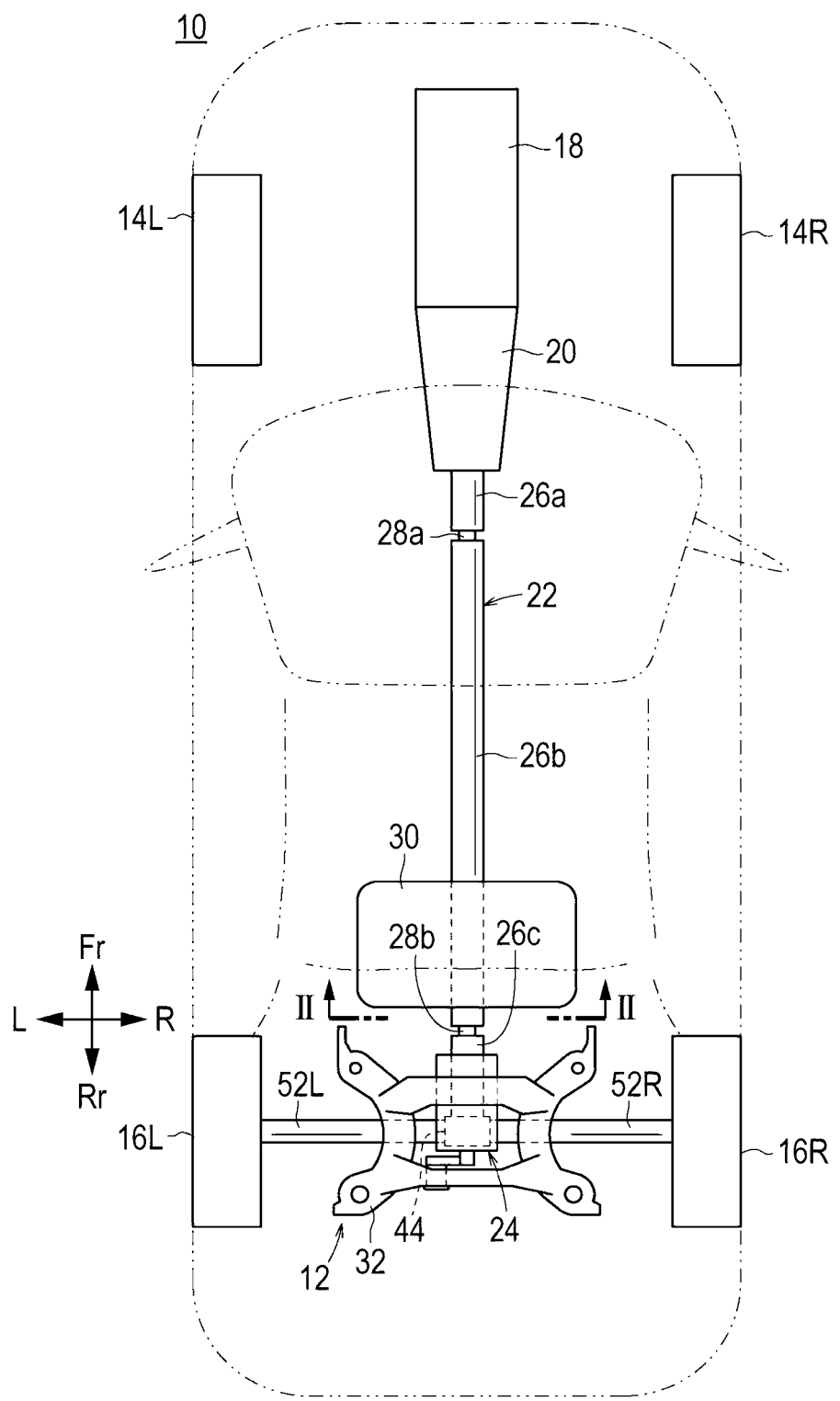
FIG. 1 is an exemplary diagram of a vehicle equipped with a differential unit according to an exemplary embodiment of the disclosure.

As shown in FIG. 1, a vehicle (automobile) 10 is configured as an FR (Front engine Rear drive) vehicle, for example, and includes a vehicle body frame 12, left and right front wheels 14L, 14R as a steering wheel, left and right rear wheels 16L, 16R as drive wheels, an engine (internal combustion engine) 18 provided on the front side of the vehicle 10, a transmission mechanism 20 connected to the engine 18, a propeller shaft part 22 coupled to the transmission mechanism 20 and running in the fore-and-aft direction of the vehicle 10, and a differential unit 24 coupled to the rear end of the propeller shaft part 22.

The propeller shaft part 22 has, for example, a front shaft 26a coupled to the transmission mechanism 20, an elongated middle shaft 26b coupled to the rear end of the front shaft 26a via a universal joint 28a, and a rear shaft 26c coupled to the rear end of the middle shaft 26b via a universal joint 28b. The propeller shaft part 22 may include a single elongated shaft.

Figure 2:
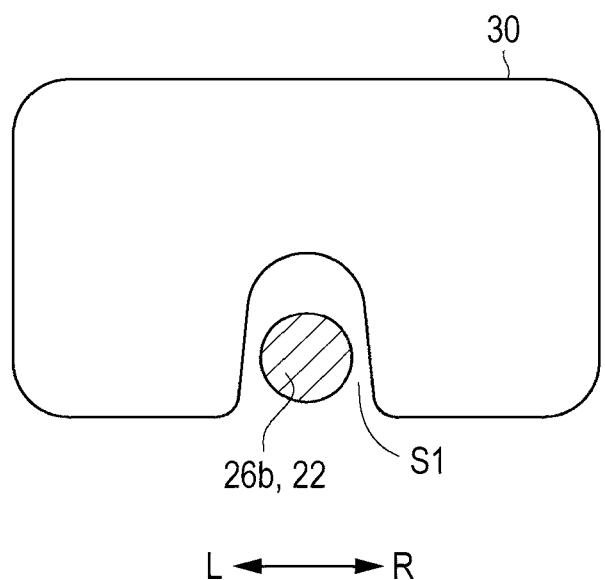
FIG. 2 is a cross-sectional view along line II-II in FIG. 1.

A fuel tank 30 is mounted on the vehicle 10 at a position slightly frontward of the differential unit 24. As shown in FIG. 2, the fuel tank 30 is structured as a what is called saddle type fuel tank with the center portion of its bottom side in the widthwise direction of the vehicle 10 being curved upward. In other words, the lower portions of the fuel tank 30 are formed apart from each other in the widthwise direction of the vehicle 10. The propeller shaft part 22 (middle shaft 26b) is disposed in a clearance S1 between the lower portions of the fuel tank 30. Accordingly, the fuel tank 30 adjoins the propeller shaft part 22 in the widthwise direction of the vehicle 10.

The fuel tank 30 adjoins the propeller shaft part 22 in the widthwise direction of the vehicle 10 this way, and may be structured as a what is called side saddle type fuel tank.

Figure 3:
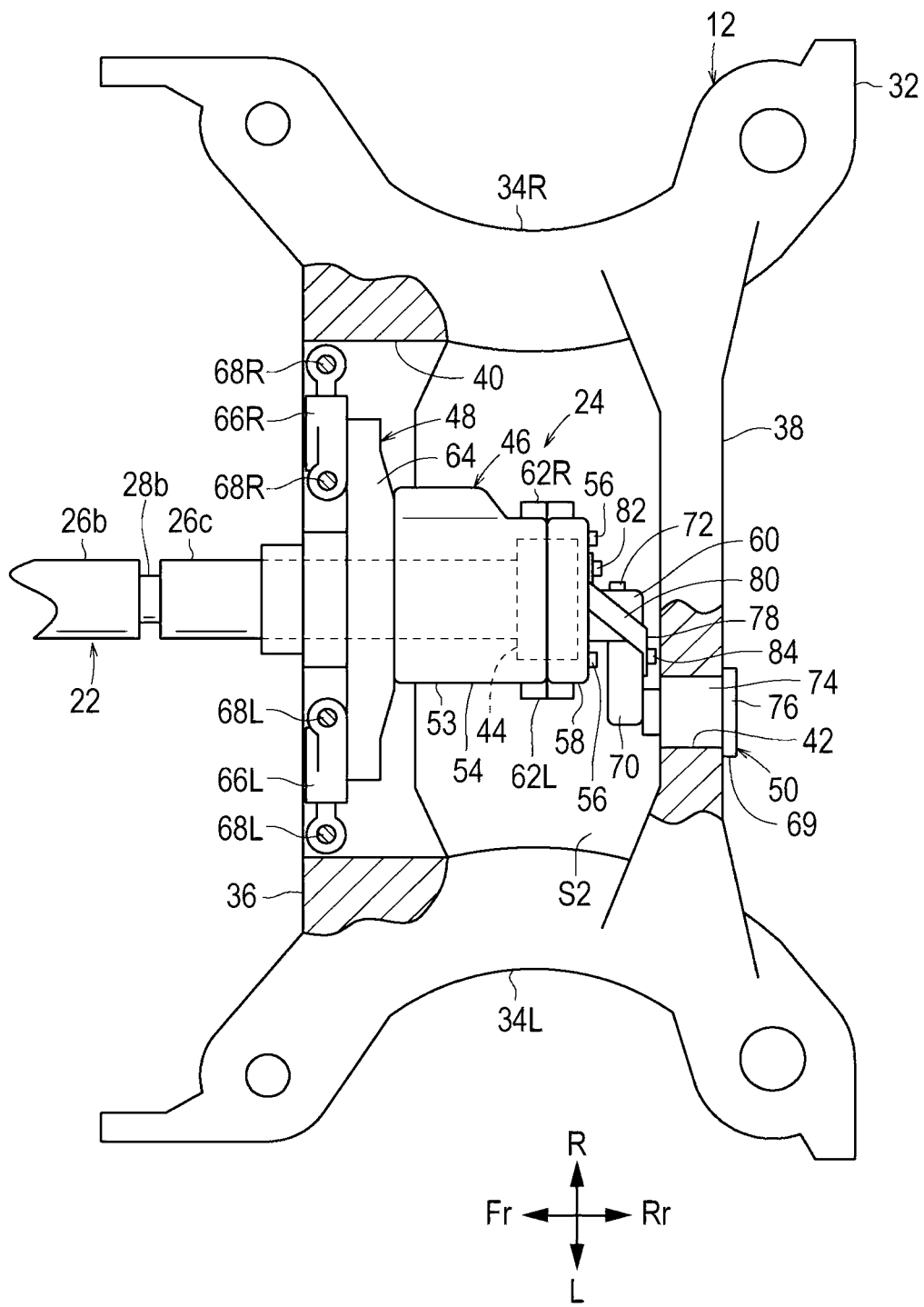
FIG. 3 is a partly cross-sectional enlarged plan view showing the differential unit, a propeller shaft and a rear sub-frame shown in FIG. 1.

As shown in FIG. 3, the vehicle body frame 12 has a rear sub-frame 32 which supports the differential unit 24. The rear sub-frame 32 includes left and right side frames 34L, 34R disposed apart from each other in the widthwise direction of the vehicle 10 and extending in the fore-and-aft direction thereof, and front and rear cross members 36, 38 which are disposed apart from each other in the widthwise direction of the vehicle 10 to connect the pair of side frames 34L, 34R.

The differential unit 24 is disposable in a clearance S2 formed by the left and right side frames 34L, 34R and the front and rear cross members 36, 38. The front cross member 36 is formed slightly wide in the fore-and-aft direction of the vehicle 10. The front cross member 36 has a through hole 40 formed in its center portion in the widthwise direction of the vehicle 10. The rear cross member 38 is formed slightly narrower in the fore-and-aft direction of the vehicle 10. The rear cross member 38 has a through hole 42 formed therein at a position slightly closer to the left side frame 34L than a center portion of the rear cross member 38 in the widthwise direction of the vehicle 10.

Figure 4:
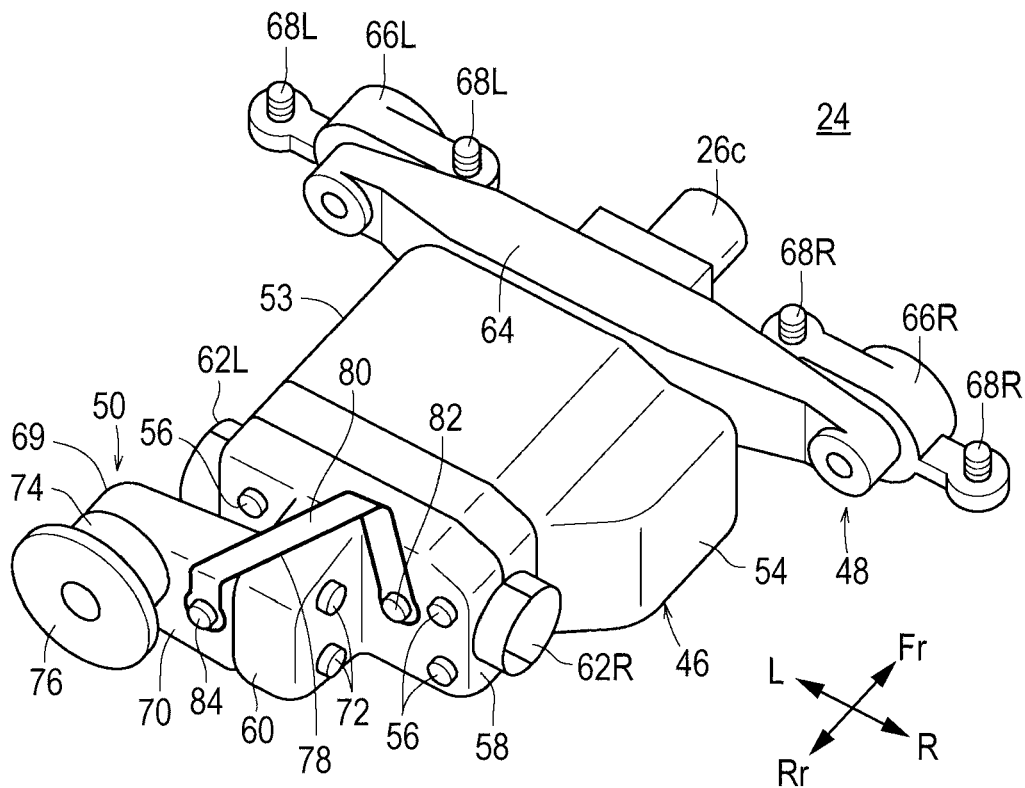
FIG. 4 is a perspective view the differential unit shown in FIG. 3.

As shown in FIGS. 1, 3 and 4, the differential unit 24 has a differential gear 44 coupled to the rear end of the rear shaft 26c, a housing 46 accommodating the differential gear 44, a first mount part 48 provided on the housing 46 on the front side of the vehicle 10, and a second mount part 50 provided on a rear end portion of the housing 46.

Though a detailed illustration is omitted, the differential gear 44 engages with gears of a left wheel shaft 52L connected to the left rear wheel 16L, and engages with gears of a right wheel shaft 52R connected to the right rear wheel 16R (see FIG. 1).

The housing 46 includes a housing body 53 accommodating the differential gear 44, and a projection 60 projecting rearward of the vehicle 10 from a center portion of the housing body 53 in the widthwise direction of the vehicle 10.

The housing body 53 is provided with a first case 54 enclosing the rear end side of the rear shaft 26c constituting the propeller shaft part 22, and a second case 58 positioned rearward of the first case 54 in the vehicle 10 and fastened to the first case 54 by a plurality of bolts 56.

Insertion openings 62L, 62R where the aforementioned left and right wheel shafts 52L, 52R are inserted are formed in coupling portions of the first case 54 and the second case 58. The projection 60 is formed on the second case 58.

The first mount part 48 is disposed in the through hole 40 of the front cross member 36, and includes a support member 64 provided on the first case 54 and extending in the widthwise direction of the vehicle 10, and left and right attachment portions 66L, 66R provided on both sides of the support member 64. A plurality of bolts 68L, 68R (two bolts in the embodiment) to be fastened with a wall surface forming the through hole 40 are provided at each attachment portion 66L, 66R.

The second mount part 50 has a bracket member 69 fixed to the rear cross member 38, and a stay member 78 provided separate from bolts 72 to couple the projection 60 and the bracket member 69 together.

The bracket member 69 includes a first bracket 70 provided on one side surface of the projection 60 in the widthwise direction of the vehicle 10 (side surface on the left side of the vehicle), a plurality of (two) bolts (fastening member) 72 which fasten the projection 60 and the first bracket 70 together, a second bracket (fixture part) 74 which is provided on the first bracket 70 and is inserted into the through hole 42 of the rear cross member 38, and a flange portion (separation inhibiting member) 76 provided on the rear end of the second bracket 74.

Each bolt 72 pierces through the projection 60 from the other side surface (side surface on the right side of the vehicle) of the projection 60 in the widthwise direction of the vehicle 10. That is, each bolt 72 extends in the widthwise direction of the vehicle 10 with the projection 60 and the first bracket 70 fastened together. The flange portion 76 is formed slightly larger than the diameter of the through hole 42. This can desirably suppress separation of the second bracket 74 from the through hole 42 in the forward direction of the vehicle 10.

The stay member 78 includes a stay body 80, a first fastening bolt 82 which fastens the stay body 80 to the rear end surface (surface facing rearward of the vehicle 10) of the second case 58, and a second fastening bolt 84 which fastens the stay body 80 to the rear end surface (surface facing rearward of the vehicle 10) of the first bracket 70.

The stay body 80 is formed by, for example, a metal plate with a narrow width. It is to be noted however that the stay body 80 may be formed of a material other than metal. The stay body 80 is disposed so as to ride across the projection 60 in the widthwise direction of the vehicle 10 in a curved state. The plate-like and curved formation of the stay body 80 can permit the stay body 80 to easily ride across the projection 60. The stay body 80 is not in contact with the projection 60.

According to the vehicle 10 configured in the above manner, a buffer load acting rearward of the vehicle 10 acts on the propeller shaft part 22 upon collision of the vehicle 10 on its front side, so that the connecting portion at which the support member 64 and the housing 46 are connected may be broken.

Consequently, the differential unit 24 is pushed by the propeller shaft part 22 and displaced rearward of the vehicle 10, so that the rear end surface of the projection 60 abuts on the rear cross member 38. When the buffer load acts under this situation, stress may be concentrated on the universal joint 28b constituting the propeller shaft part 22, bending the propeller shaft part 22.

Figure 5:
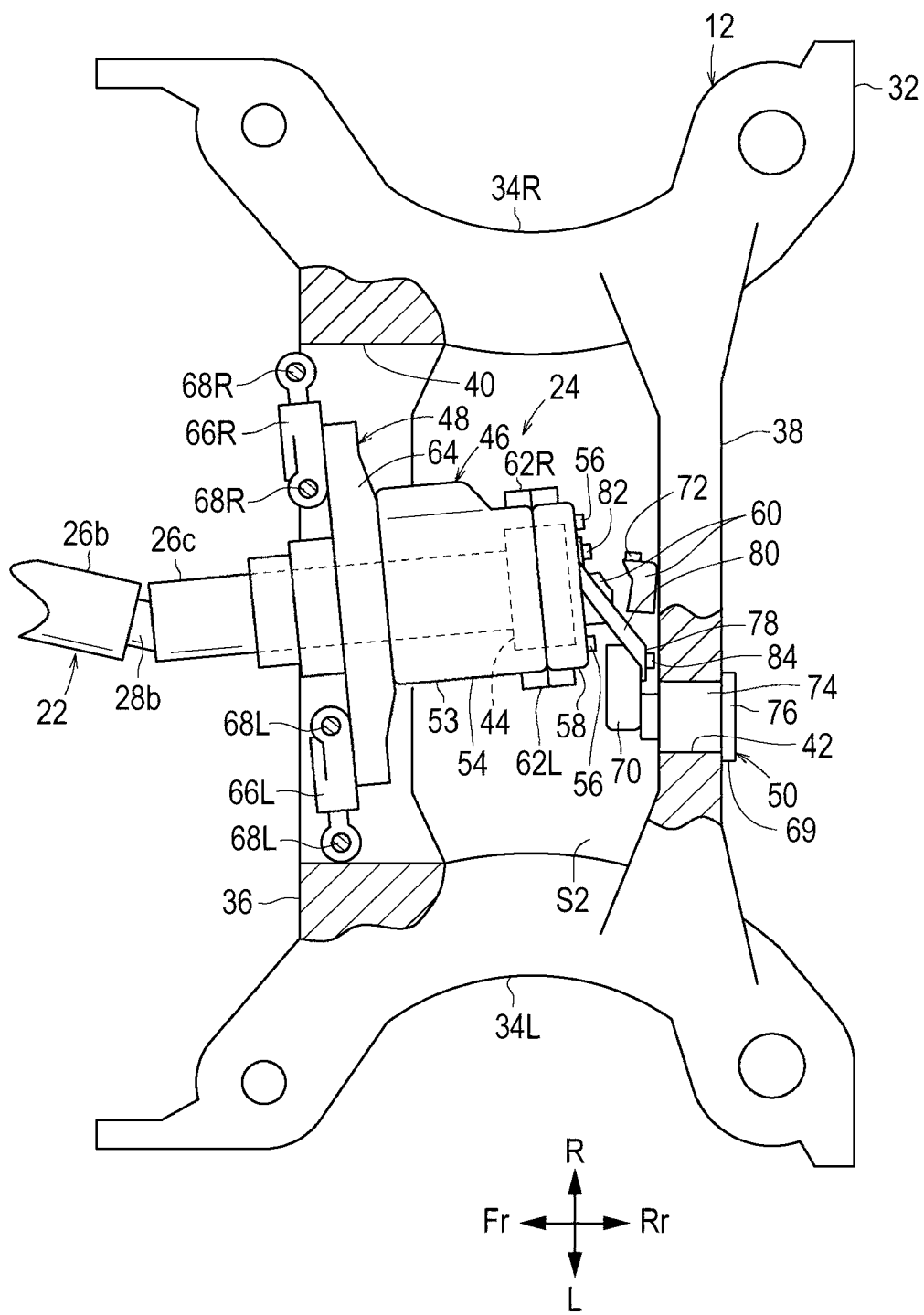
FIG. 5 is an explanatory diagram showing a projection broken upon collision of a vehicle on its front side.
Figure 6A:
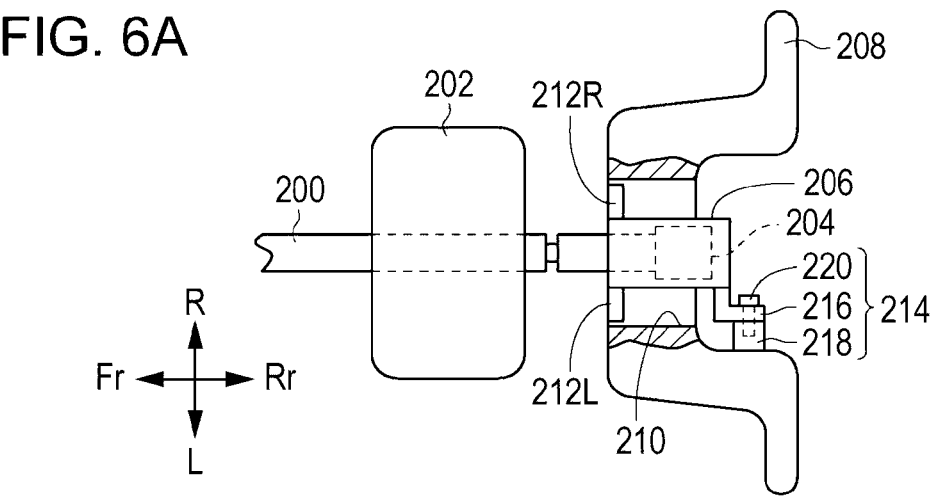
FIG. 6A is a partly cross-sectional explanatory diagram showing a differential gear according to the related art and around the differential unit.
Figure 6B:
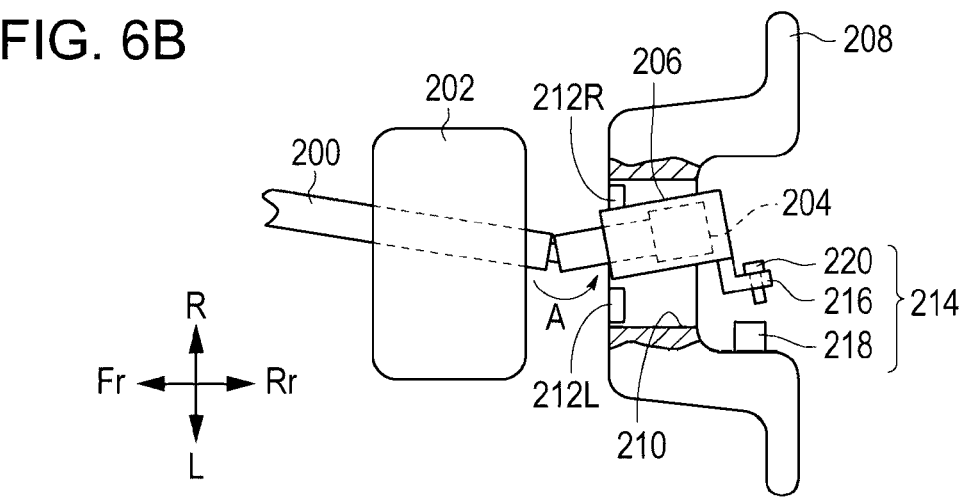
FIG. 6B is a partly cross-sectional explanatory diagram showing a propeller shaft broken, and fastening portions of a first bracket and a second bracket being separated from each other upon collision of a vehicle on its front side.
Figure 6C:
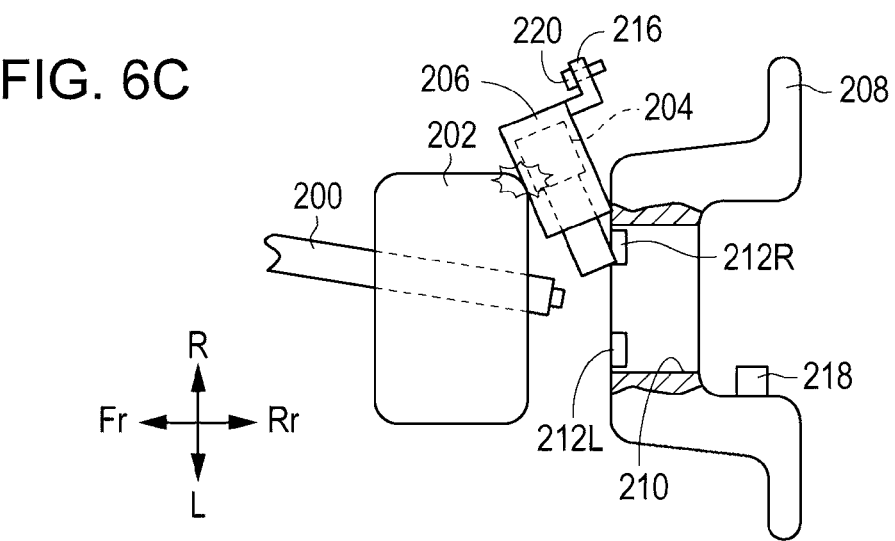
FIG. 6C is a partly cross-sectional explanatory diagram showing a housing accommodating the differential gear being hit against a fuel tank.

Then, moment toward the right side frame 34R, for example, acts on the housing 46. In this case, as shown in FIG. 5, the projection 60 is broken along the extending direction of the bolt 72 (in the widthwise direction of the vehicle 10), resulting in separation of the housing 46 and the first bracket 70 fastened by a plurality of bolts 72.

According to the embodiment, however, the stay member 78 is provided separate from the bolts 72 as mentioned above, thus making it possible to suppress separation (coming off) of the housing 46 from the first bracket 70. In other words, it is possible to suppress separation of the housing 46 from the rear sub-frame 32.

Particularly, the first fastening bolt 82 and the second fastening bolt 84 extend in the fore-and-aft direction of the vehicle 10 (in the direction orthogonal to the extending direction of the bolt 72), so that even if the moment acts on the housing 46, the housing 46 is not easily separated from the first bracket 70.

Further, the flange portion 76 is provided on the rear end of the second bracket 74, so that even if the moment acts on the housing 46, the second bracket 74 does not come off the through hole 42 of the rear cross member 38 in the forward direction of the vehicle 10.

Accordingly, it is possible to inhibit the housing 46 from being thrown out in the forward direction of the vehicle 10 to hit the fuel tank 30, thus preventing the fuel tank 30 from being damaged by such hitting.

Although the description of the embodiment has been given of the case of forward collision of a vehicle by way of example for the ease of understanding, similar effects would be demonstrated even in a case of side collision of a vehicle, rear collision of a vehicle, or the like.

According to the embodiment, the stay body 80 is disposed to ride across the projection 60, the first fastening bolt 82 is attached to the rear end surface of the second case 58, and the second fastening bolt 84 is attached to the rear end surface of the first bracket 70, so that the stay member 78 can be arranged efficiently. This can suppress enlargement of the differential unit 24.

According to the embodiment, as described above, the vehicle 10 includes the rear sub-frame 32 constituting a part of the vehicle body frame 12, the propeller shaft part 22 extending in the fore-and-aft direction of the vehicle 10, the fuel tank 30 disposed adjacent to the propeller shaft part 22 in the widthwise direction of the vehicle 10, and the differential unit 24 supported by the rear sub-frame 32 and coupled to the rear end of the propeller shaft part 22.

The differential unit 24 includes the differential gear 44 coupled to the rear end of the propeller shaft part 22 (rear shaft 26c), the housing 46 positioned rearward of the fuel tank 30 in the vehicle 10 to accommodate the differential gear 44, the bracket member 69 fixed to the rear sub-frame 32, the bolts (fastening member) 72 which fastens the housing 46 and the first bracket 70 together, and the stay member 78 provided separate from the bolts 72 to couple the housing 46 and the first bracket 70 together.

According to the differential unit 24, because the stay member 78 to couple the housing 46 and the bracket member 69 together is provided separate from the bolts 72, even if, for example, the bolts 72 fastening the housing 46 and the bracket member 69 together come off upon collision of the vehicle 10, it is possible to desirably suppress separation of the housing 46 from the bracket member 69 (rear cross member 38). This can inhibit the housing 46 from hitting the fuel tank 30, thus preventing the fuel tank 30 from being damaged by such hitting.

In the differential unit 24, the bolts 72 may extend in the widthwise direction of the vehicle 10 with the housing 46 fastened to the bracket member 69, and the stay member 78 may have the stay body 80, the first fastening bolt 82 extending in a direction orthogonal to the widthwise direction of the vehicle 10 to fasten the stay body 80 and the housing 46 together, and the second fastening bolt 84 extending in the direction orthogonal to the widthwise direction of the vehicle 10 to fasten the stay body 80 and the first bracket 70.

With the above configuration, the each of the first fastening bolt 82 and the second fastening bolt 84 extends in the direction orthogonal to the extending direction of the bolt 72 (widthwise direction of the vehicle 10), so that even if moment in the direction of pulling out the bolts 72 acts on the housing 46 upon collision of the vehicle 10, the first fastening bolt 82 and the second fastening bolt 84 cannot be easily separated. This can surely suppress separation of the housing 46 from the bracket member 69.

Further, in the differential unit 24, the housing 46 may have the housing body 53, and the projection 60 which projects from the housing body 53 rearward of the vehicle 10 and to which the bolts 72 are attached, the stay body 80 may be disposed so as to ride across the projection 60, the first fastening bolt 82 may be attached to that portion of the outer surface of the housing body 53 which faces rearward of the vehicle 10, and the second fastening bolt 84 may be attached to that portion of the outer surface of the bracket member 69 which faces rearward of the vehicle 10.

With such a configuration, the stay member 78 can be arranged efficiently, thus suppressing enlargement of the differential unit 24.

Furthermore, in the differential unit 24, the stay body 80 may be formed in a plate-like shape and curved.

With such a configuration, the stay body 80 is formed like a plate and curved, the stay body 80 can be easily made to ride across the projection 60 constituting the housing 46.

In the differential unit 24, the bracket member 69 may have the second bracket (fixture part) 74 penetrating the rear sub-frame 32 in the fore-and-aft direction of the vehicle, and the flange portion (separation inhibiting member) 76 inhibiting the second bracket 74 from coming out of the through hole 42 in the rear sub-frame 32.

With this configuration, the bracket member 69 has the second bracket 74 and the flange portion 76, so that it is possible to surely suppress the bracket member 69 from being separated from the rear sub-frame 32 upon collision of the vehicle.

The disclosure is not limited to the foregoing embodiment, and may take various configurations without departing from the subject matter of the disclosure.

For example, the stay member 78 may be structured in such a way that each of the first fastening bolt 82 and the second fastening bolt 84 extends in the up and down direction of the vehicle 10 (direction orthogonal to both the widthwise direction of the vehicle 10 and the fore-and-aft direction thereof). Accordingly, even if moment in the direction of pulling out the bolts 72 acts on the housing 46 upon collision of the vehicle 10, the first fastening bolt 82 and the second fastening bolt 84 cannot be easily separated.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A differential unit for use in a vehicle, the vehicle comprising:
   a rear sub-frame forming a part of a vehicle body frame,
   a propeller shaft extending in a fore-and-aft direction of the vehicle, and
   a fuel tank disposed adjacent to the propeller shaft in a widthwise direction of the vehicle, the differential unit comprising:
   a differential gear coupled to a rear end of the propeller shaft;
   a housing positioned rearward of the fuel tank to accommodate the differential gear;
   a bracket member fixed to the rear sub-frame;
   a fastening member that fastens the housing and the bracket member together; and
   a stay member provided separate from the fastening member to couple the housing and the bracket member together,
   wherein the stay member is attached to the bracket member by a second fastening member, wherein the second fastening member is a second fastening bolt extending in the fore-and-aft direction of the vehicle such that a longitudinal axis of the second fastening bolt extends in the fore-and-aft direction of the vehicle.

2. The differential unit according to claim 1, wherein the bracket member has a fixture part penetrating the rear sub-frame in the fore-and-aft direction of the vehicle, and a separation inhibiting member inhibiting the fixture part from coming out of a through hole formed in the rear sub-frame.

3. The differential unit according to claim 1, wherein the housing includes a projection portion projecting in a rearward direction of the housing, the projection portion being connected to the bracket member by the fastening member, and
   wherein the fastening member extends in the width direction of the vehicle.

4. The differential unit according to claim 1, wherein the fastening member is a bolt extending in the widthwise direction of the vehicle with the housing and the bracket member fastened together, and
   wherein the stay member has a stay body, and a first fastening bolt extending in a direction orthogonal to the widthwise direction of the vehicle to couple the stay body and the housing together.

5. The differential unit according to claim 4, wherein the housing has a housing body and a projection which projects in a rearward direction of the vehicle from the housing body and to which the fastening member is attached,
   the stay member is disposed across the projection,
   the first fastening bolt is attached to a portion of an outer surface of the housing body which faces in the rearward direction of the vehicle, and
   the second fastening bolt is attached to a portion of an outer surface of the bracket member which faces in the rearward direction of the vehicle.

6. The differential unit according to claim 5, wherein the stay body is formed in a substantially plate shape and curved.

7. A vehicle comprising:
   a vehicle body frame;
   a rear sub-frame forming a part of the vehicle body frame;
   a propeller shaft extending in a fore-and-aft direction of the vehicle;
   a fuel tank disposed adjacent to the propeller shaft in a widthwise direction of the vehicle; and a differential unit supported on the rear sub-frame and coupled to a rear end of the propeller shaft, wherein said differential unit comprises:

a differential gear coupled to the rear end of the propeller shaft;

a housing positioned rearward of the fuel tank to accommodate the differential gear;

a bracket member fixed to the rear sub-frame;

a fastening member that fastens the housing and the bracket member together; and a stay member provided separate from the fastening member to couple the housing and the bracket member together, wherein the stay member is attached to the bracket member by a second fastening member, wherein the second fastening member is a second fastening bolt extending in the fore-and-aft direction of the vehicle such that a longitudinal axis of the second fastening bolt extends in the fore-and-aft direction of the vehicle.

8. The vehicle according to claim 7, wherein the bracket member has a fixture part penetrating the rear sub-frame in the fore-and-aft direction of the vehicle, and a separation inhibiting member inhibiting the fixture part from coming out of a through hole formed in the rear sub-frame.

9. The vehicle according to claim 7, wherein the housing includes a projection portion projecting in a rearward direction of the housing, the projection portion being connected to the bracket member by the fastening member, and wherein the fastening member extends in the width direction of the vehicle.

10. The vehicle according to claim 7, wherein the fastening member is a bolt extending in the widthwise direction of the vehicle with the housing and the bracket member fastened together, and wherein the stay member has a stay body, and a first fastening bolt extending in a direction orthogonal to the widthwise direction of the vehicle to couple the stay body and the housing together.

11. The vehicle according to claim 10, wherein the housing has a housing body and a projection which projects in a rearward direction of the vehicle from the housing body and to which the fastening member is attached, the stay member is disposed across the projection, the first fastening bolt is attached to a portion of an outer surface of the housing body which faces in the rearward direction of the vehicle, and the second fastening bolt is attached to a portion of an outer surface of the bracket member which faces in the rearward direction of the vehicle.

12. The vehicle according to claim 11, wherein the stay body is formed in a substantially plate shape and curved.

* * * * *